United States Patent [19]
Dehennau et al.

[11] Patent Number: 5,958,524
[45] Date of Patent: *Sep. 28, 1999

[54] PROCESS FOR THE SURFACE TREATMENT OF ARTICLES COMPRISING AT LEAST ONE PLASTIC MATERIAL

[75] Inventors: Claude Dehennau, Waterloo; Zdenek Hruska, Brussels; Frédéric Menu, Frameries, all of Belgium

[73] Assignee: Solvay (Société Anonyme), Brussels, Belgium

[ * ] Notice: This patent is subject to a terminal disclaimer.

[21] Appl. No.: 08/902,074

[22] Filed: Jul. 29, 1997

Related U.S. Application Data

[63] Continuation of application No. 08/423,148, Apr. 17, 1995, abandoned.

[30] Foreign Application Priority Data

Apr. 19, 1994 [BE] Belgium ................ 09400404

[51] Int. Cl.$^6$ ................ B05D 3/04; B05D 3/14
[52] U.S. Cl. ................ 427/533; 427/261; 427/444; 427/536; 427/539; 156/272.6
[58] Field of Search ................ 427/256, 273, 427/307, 444, 532, 534, 536, 261, 535, 322, 539, 533; 101/38.1–40.1, 422, 488, 483; 264/83, 483; 156/272.2, 272.6

[56] References Cited

U.S. PATENT DOCUMENTS

| | | | |
|---|---|---|---|
| 4,296,151 | 10/1981 | Boultinghouse | 427/255.1 |
| 4,929,319 | 5/1990 | Dinter et al. | 204/164 |
| 5,654,378 | 8/1997 | Dehennau et al. | 525/333.7 |

FOREIGN PATENT DOCUMENTS

| | | |
|---|---|---|
| 0257321 | 3/1988 | European Pat. Off. |
| 35 35 602 | 4/1987 | Germany. |
| 5-329-342 | 12/1993 | Japan. |
| 5329342 | 12/1993 | Japan. |
| 93/24559 | 12/1993 | WIPO. |
| 9324559 | 12/1993 | WIPO. |

OTHER PUBLICATIONS

Hawley's "Condensed Chemical Dictionary", 12th Ed, p. 317, 1993.
Stradal et al.: "The Effect of Corona and Ozone Treatment on the Adhesion of Ink to the Surface of Polyethylene". In: Polymer Engineering and Science, Jan. 1977, vol. 17, No. 1, pp. 38–41.
Journal of Applied Polymer Science, Appl. Polym. Symp., vol. 46, 61 (1990).
Journal of Applied Polymer Science, vol. 50, 585–599, (1993). An XPS Investigation of Polymer Surface Dynamics. I. A Study of Surfaces Modified by $CF_4$ and $CF_4/CH_4$ Plasmas.
Milker, Roland, et al., "Fluor macht Kunststoffe gefügig," [Fluorine makes plastics flexible] (1989)., Page numbers not provided.
Milker, Roland, et al., "Oberflächenvorbehandlung von bahnförmigen Polymeren mittels Fluor—ein Erfahrungsbericht," Coating Jan. 1988, pp. 8–12.
Derwent Publications Ltd., English Abstract of DE 35 35 602, dated Apr. 9, 1987.

*Primary Examiner*—Frederick Parker
*Attorney, Agent, or Firm*—Venable; George H. Spencer; John W. Schneller

[57] ABSTRACT

The invention relates to a process for the surface treatment of at least one portion of an article comprising at least one plastic material, the process comprising a step of fluorination for out most 12 seconds, following a step of an energetic surface oxidation of this portion.

6 Claims, No Drawings

PROCESS FOR THE SURFACE TREATMENT OF ARTICLES COMPRISING AT LEAST ONE PLASTIC MATERIAL

This application is a Continuation, of application Ser. No. 08/423,148, filed Apr. 17, 1995, abandoned.

FIELD OF THE INVENTION

The invention relates to a process for the surface treatment of articles comprising at least one plastic material, which in particular makes it possible for their printability and their adhesion to be improved.

TECHNOLOGY REVIEW

In many applications, articles made of plastic material, and in particular films, sheets and hollow bodies, are printed by means of conventional printing techniques such as screen printing, photogravure or flexography.

Inks have been developed specifically for printing on articles made of certain plastics exhibiting very particular surface chemical characteristics, for example on articles based on polymethyl methacrylate (PMMA) or polyvinyl chloride (PVC); they are generally termed "inks for PVC".

Inks for PVC are greatly appreciated by printers since these inks generally give the printed patterns a printing quality superior to that obtained by means of other types of inks for plastic. However, plastic materials converters are making increasing attempts to extend the field of application of these inks to other plastic materials, especially to polyolefins. To meet this demand, it has been necessary for novel surface treatment techniques to be developed by the plastics and paint industries so as to make it possible for articles made of such other plastic materials to be printed on conventional printing lines. Indeed, because of their non-polar nature, certain plastic materials, such as the polyolefins, require a suitable surface treatment before printing on them and the use of an ink designed for these materials. Although these treatments increase the polarity of the surfaces thus treated, the inks used to print these articles remain specific to them; in the case of polyolefins, for example, they are often termed "inks for polyolefins". Unfortunately, these inks are ineffective for printing on PVC articles, to which they do not adhere. Likewise, the inks used for printing on PVC generally do not adhere to polyolefin-based articles, even when these have been surface treated.

This situation obliges printers to change ink according to whether they are printing on PVC articles or polyolefin (PO) articles, this involving complete cleaning of the installation. However, printers remain very attracted by inks for PVC since in many cases these inks offer superior printing quality.

There is therefore still a market demand either for a PO film which can be printed both using inks for PVC and using inks for PO, or for a universal ink which has the same performance as the inks for PVC but which can be used both on surface-treated PO mediums and on PVC mediums. To date, neither of these solutions is available.

Extensive work has been carried out to explain the adhesion of inks by the chemical modifications undergone at the surface by articles surface-treated using treatments such as corona discharge or flame brushing. For polyethylene articles, for example, there is a correlation between the adhesion and the degree of oxidation of the surface after the treatment (The Effect of Corona and Ozone Treatment on the Adhesion of Ink to the Surface of Polyethylene—Polymer Engineering and Science, January 1977, vol. 17, No. 1, pp. 38–41). Plasma treatment has also been widely studied; unfortunately, this technique is expensive and remains limited to the batch treatment of high-value-added products, which rules out the continuous treatment of standard products. In recent years, particular attention has been paid to fluorination (as described, for example, in U.S. Pat. No. 4,296,151) and oxyfluorination techniques. Both techniques, which can be carried out continuously, are known to improve the adhesion of ink or of various coatings to PO-based articles. In a document (WO 93/24559) relating to packaging films exhibiting certain tribological properties, as well as characteristics also rendering them suitable for certain types of printing, it has furthermore been recommended to use particular oxygen and fluorine surface contents.

Despite all this work however, no solution currently makes it possible to produce plastic-based articles, and in particular polyolefin-based articles, which can be printed equally well by inks for PVC and those for PO.

Furthermore, some of the surface treatments mentioned hereinabove are only effective in the short term, that is to say, for example, a polyolefin film treated by corona discharge is in fact suitable for top-quality printing using an ink for PO for the weeks following its treatment, but loses this property over time. This constitutes a major industrial and economic drawback given that most articles are printed at a location other than their place of manufacture, or are stored before being printed, which means that a delay of several months may sometimes separate their manufacture from their printing.

SUMMARY OF THE INVENTION

The object of the present invention is consequently to provide a process for the surface treatment of at least one portion of an article comprising at least one plastic material, making it possible to obtain an article for which the treated portions can be printed equally well using any type of ink for plastic material and for which the printability remains stable over time.

DETAILED DESCRIPTION OF THE INVENTION

To this end, the first subject of the invention is a process for the surface treatment of at least one portion of an article comprising at least one plastic material, characterized in that it comprises at least one fluorination step and one step of energetic surface oxidation of this portion.

The articles related to within the scope of the present invention may be of any type, especially flat articles such as films, sheets or panels, or else hollow bodies such as bottles, drums, tanks, flasks, pipes, etc. The invention is particularly advantageous in the case of flat articles, especially in the case of films. These articles may be produced by any means, especially by calendering, by extrusion or by coextrusion, for example by extrusion blow-moulding, extrusion coating, slot-die extrusion as well as by related coextrusion techniques. In accordance with the invention, at least one surface portion of the article must comprise at least one plastic material. Preferably, this portion is essentially made of at least one plastic material. One or more other parts of the article may essentially be made of one or more other materials, such as metal or a cellulosic material. The invention applies to single-layer and multilayer articles. Thus, for example, the invention applies advantageously to a multilayer composite article in which at least the surface layer to be treated comprises at least one plastic material. Preferably, the said layer is essentially made of at least one plastic material. In this case, one or more other layers may essentially be made of one or more other materials.

"Plastic material" is intended to denote any thermoplastic, elastomeric or thermosetting polymer, as well as any blend of such polymers. The term "polymer" denotes both homopolymers and copolymers. Good results have been obtained with thermoplastic polymers. In particular, very good results have been obtained with vinyl chloride (VC) polymers, either plasticized or unplasticized, with vinylidene fluoride (VdF) polymers and with polyolefins. Vinyl chloride polymers include polyvinyl chloride itself, as well as copolymers of VC with one or more other comonomers, such as vinylidene chloride or vinyl acetate. Vinylidene fluoride polymers include polyvinylidene fluoride itself, as well as copolymers of VdF with one or more other monomers such as hexafluoropropylene.

The process according to the invention gives good results when the plastic material contained in the portion to be treated comprises at least one polyolefin. Polyolefin is intended to denote any olefin homopolymer, any copolymer consisting of at least two different types of olefins, as well as any copolymer comprising at least 70% of units derived from olefins, as well as blends of these homopolymers and/or copolymers. Olefins is also intended to denote both mono-olefins such as ethylene, propylene or butene, and olefins which include more than one double bond, for example diolefins such as butadiene. By way of non-limiting examples of polyolefins, mention may be made of the polymers of propylene and of ethylene. This is intended to denote both their homopolymers and their copolymers, the latter possibly comprising, in addition to propylene and/or ethylene, one or more other olefinic comonomers, the total quantity of these preferably remaining less than 20% with respect to the weight of the copolymer. Advantageous results have been obtained when the plastic material in the portion to be treated is essentially made of a propylene polymer or of a blend comprising 50 to 99% (with respect to the total weight of the polymers) of at least one propylene polymer and 50 to 1% of at least one ethylene polymer.

Several different plastic materials may possibly be used, as homogeneous or heterogeneous blends, for example for the purpose of improving the impact strength of the article.

One or more conventional inorganic fillers, such as calcium carbonate, titanium dioxide, mica, etc., fillers of vegetable origin such as wood flour, reinforcement fibres such as, for example, glass or carbon fibres, as well as one or more conventional additives such as stabilizers, lubricants, antioxidants, etc. may furthermore be possibly added to this or these plastic materials.

Fluorination is intended to denote any known treatment using a gas mixture containing fluorine and making it possible for the latter to be chemically bound to a plastic material. Examples of these are given in the Documents U.S. Pat. No. 4,296,151 and WO 93/24559 mentioned hereinabove, as well as in the examples which follow (by way of non-limiting example). Preferably, a mixture of nitrogen and of 1 to 10% by volume of fluorine is used. Preferably, the pressure of this mixture is close to atmospheric pressure. Good results are obtained when the temperature is 25 to 90° C. In order to achieve this, the chamber and/or the gas mixture may be heated. The duration of this treatment is obviously related to the overall set of operating conditions. The fluorination is generally of short duration. The duration of the fluorination is advantageously at most 12 seconds. Preferably, it does not exceed 4 seconds and more preferably still does not exceed 2 seconds. The gas mixture used may possibly furthermore contain oxygen or other gases. In practice, it is moreover very difficult, most especially in continuously operating installations, to prevent the presence of traces of oxygen during the fluorination. The fluorination may be carried out continuously or in batch mode; for practical reasons, however, it is preferred to carry it out continuously.

"Energetic surface oxidation" is intended to denote any high-energy oxidative treatment, such as flame brushing, corona discharge, plasma treatment in the presence of oxygen, ozone treatment or else a step of oxidation in oxygen with heating to a temperature less than the melting point of the material in the portion, as well as combinations of a plurality thereof. These treatments make it possible for oxygen to be chemically bound to a plastic.

When oxidation in oxygen with heating is adopted, the portion is preferably heated to a temperature 20 to 130° C. lower than the melting point of its constituent material. This heating may be carried out by any known means, for example using infrared radiation or using hot-air blowing.

Preferably, the energetic surface oxidation comprises a corona treatment. Advantageously, the latter is performed in an atmosphere essentially consisting of air, at a pressure close to atmospheric pressure. Preferably, the voltage applied is of the order of 10 to 30 kV. The frequency used is preferably of the order of 10 to 30 kHz.

Advantageously, oxidation with heating and corona treatment are combined.

The energetic surface oxidation may be carried out continuously or in batch mode; for practical reasons, it is most often preferred to carry it out continuously.

The energetic surface oxidation and the fluorination may be performed in any order. They may also be carried out simultaneously, for example using a cold-plasma treatment as described, especially, in J. Appl. Polym. Sci., Appl. Polym. Symp., vol. 46, 61 (1990) and in J. Appl. Polym. Sci., vol. 50, 585 (1993) or by oxyfluorination with heating. Generally, it is preferred that these treatments be separated in time. In this case, it is most particularly preferred that at least one fluorination step be preceded by at least one energetic surface oxidation step. The various steps may be separated by any time periods on condition that the activation effect of a given step still remains at the time of the next one. Thus, the surface treatment process may comprise an energetic surface oxidation step followed by a fluorination step several days later. Nevertheless, in the particular case where the powerful surface oxidation comprises oxidation with heating, the oxidation with heating is most often rapidly followed by the fluorination step and it is actually preferable that these two treatments be simultaneous. Furthermore, it is preferred, especially for reasons of productivity, to carry out the entire surface treatment continuously, the various steps mentioned hereinabove being carried out one after the other and without significant delay. Particularly preferably, the surface treatment is carried out in line, with the steps manufacturing the articles (extrusion, etc.).

Advantageously, the surface treatment process essentially consists of an energetic surface oxidation step followed by a fluorination step.

The articles may be treated both in their entirety and on one or more portions of their surface. For example, in the case of a composite panel made of a steel sheet coated with a polyolefin film, it is possible to surface treat only the "film" face, or even just a certain portion of this face, without departing from the scope of the present invention. In addition to the stability over time of their printability, a particularly important advantage of the articles thus treated is that they are printable both by inks for PO and those for PVC, in contrast to the articles known hitherto.

Highly advantageous results may be obtained if a particular variant of this surface treatment process is used, with the purpose of obtaining specific oxygen and fluorine concentrations: according to an advantageous variant of the invention, the surface treatment process is such that the treated portion includes, at the surface, fluorine and oxygen in concentrations such that the oxygen/carbon (O/C) atomic ratio, measured by ESCA spectroscopy at a depth of 1.5 nm, is at least 0.08 and that the fluorine/carbon (F/C) atomic ratio, measured in the same way, has a value of at least 90% of that of the O/C ratio and of at most 290% of this ratio.

Preferably, it is performed under conditions such that, in the surface-treated portion, the O/C atomic ratio is greater than 0.1. The O/C ratio in this case is, moreover, generally less than 0.40 and preferably less than 0.30. Preferably, the F/C atomic ratio is greater than 95% of the O/C ratio. Particularly preferably, it is less than 200% of this ratio.

The ESCA (Electron Spectroscopy for Chemical Analysis) spectroscopy used for these measurements is especially described in "Practical Surface Analysis", vol. 1, D. Briggs and M. P. Seah Eds., J. Wiley & Sons Ltd., 1990.

As explained previously, the surface treatment process thus defined makes it possible to obtain articles of which at least one portion comprises at least one plastic material, in particular one or more polyolefins, to which both inks for PVC and inks for PO adhere well, even when printing takes place several months after they are manufactured.

Another subject of the present invention consequently relates to a process for manufacturing a printed article, comprising a specific surface treatment as defined hereinabove and at least one step of printing on the portion thus treated. The printing may be performed by any known process, for example using screen printing, photogravure, flexography, or by means of a wire-type doctor blade. Very good results are obtained when the printing is performed by means of inks for PVC. "Ink for PVC" is intended to denote an ink which, when applied to a PVC substrate, adheres well to the latter, that is to say obtains a rating of "1" or "2" in the test defined by the ASTM D-3359 ("Scotch tape test") standard. Non-limiting examples of such inks are provided herein-below.

Furthermore, it has also been observed with interest that the articles, and in particular the films, treated according to the surface treatment process of the invention exhibit properties, in particular adhesion properties, which render them suitable for applications other than printing. The present invention consequently aims also to cover a process for manufacturing a multi-layer composite article in which at least one layer comprises at least one plastic and has been surface treated according to the surface treatment process defined hereinabove. One advantage of the process according to the invention is that the adhesion which it confers on a plastic article is such that it is generally possible to dispense with adhesive for the purpose of using this process for the manufacture of a multilayer article. This process gives particularly advantageous results when applied to flat articles in order to form composite films, sheets or panels made of, for example,. several layers of different plastic materials or else of one or more layers of plastics and of one or more layers of other materials, such as metal, a thermoplastic material or a cellulosic material, at least one of the plastic layers having been surface treated on at least one of its faces, by means of the surface treatment process of the invention.

The two application examples of the surface treatment process of the invention which are described hereinabove (by way of non-limiting example), namely the manufacture of printed articles and the manufacture of multilayer articles, may sometimes be combined. Thus, for example, a plastic film treated on both faces in accordance with the process of the invention may be affixed to a metal, thermoplastic or cellulosic support on one of its faces and printed on the other. This combination is particularly advantageous in the packaging fields, in particular in the canning industry.

EXAMPLES

The present invention and the advantages that is affords are illustrated by the examples which follow, these having no limiting character. Examples 1R, 3R, 8R and 9R are given by way of comparison.

Example 1R

An extruded film made of a blend of PP (ELTEX® P HL001) and of PE (ELTEX® B 4020) (80:20 by weight) was continuously treated, at a rate of 5 m/min (corresponding to a 12 s treatment time) at an ambient temperature of 25° C., using a gas mixture comprising (by volume) 10% fluorine and 90% nitrogen. The oxygen content is reduced to a minimum by a nitrogen purge; nevertheless, a very small quantity of oxygen may be present, because of the imperfect sealing of the continuous treatment installation.

Example 2

Before being fluorinated, the same film as in Example 1R underwent a corona treatment, using an installation of the AHLBRANDT® trademark, at a rate of 5 m/min (corresponding to a 12 s treatment time). The system uses a 5402-type generator (frequency 30 kHz; voltage 14 kV). The two ceramic-coated electrodes are 3 mm away from the counter-electrode. The output current is 5.6 A.

Example 3R

A calendered film made of a PP-PE ELTEX® P KL 177 copolymer comprising 11 phr of $TiO_2$ was continuously treated, at a rate of 5 m/min (corresponding to a 12 s treatment time) at an ambient temperature of 25° C., using a gas mixture comprising (by volume) 5% fluorine and 95% nitrogen, at an ambient temperature of 25° C. Traces of oxygen may also be present for the same reasons as in Example 1R Example 4

Before being fluorinated as in Example 3R, the same film as in Example 3R underwent a corona treatment under the conditions mentioned in Example 2.

Example 5

A calendered film identical to the one described in Example 3R was fluorinated under the same conditions, with the exception of the temperature of the film, which was 60° C.

Example 6

Before being fluorinated as in Example 5, and after having been heated, the same film underwent a corona treatment under the conditions mentioned in Example 2.

The specimens obtained according to Examples 1R to 6 were aged for 100 hours in a ventilated oven at 70° C.

Indicated in the table below are the initial total surface tension ($\gamma^T_O$) and the surface tension ($\gamma^T_V$) after aging, measured using test inks according to the ASTM D-2587-67 standard (version of 24.02.1984), as well as the adhesion of a FICPA® VINYLOFLEX (solvent-based) ink for PVC, evaluated after aging, according to the ASTM D-3359 standard (5=Very poor, 4=Poor, 3=Moderate, 2=Good, 1=Very good).

In these examples, the printing of the films was performed by coating using a wire-type doctor blade, which makes it possible for a 6 μm ink layer to be deposited; the ink drying time (at ambient temperature) is fixed at 3 hours for all the inks used.

| Example | $\gamma^T O$ (mN/m) | $\gamma^T V$ (mN/m) | Ink adhesion |
|---|---|---|---|
| 1R | 56 | 50 | 4 |
| 2 | 56 | 54 | 1 |
| 3R | 40 | 32 | 4 |
| 4 | 48 | 39 | 1 |
| 5 | 55 | 49 | 2 |
| 6 | 58 | 50 | 1 |

The adhesion of the water-based (LORILLEUX® PACIFIC) or solvent-based (SICPA POLYFLEX) inks for PO is at the "1" level for all the films of Examples 1R to 7.

Example 7

The film and the treatment are identical to those of Example 6, but the rate is 60 m/min (corresponding to a 1 s fluorination time) The adhesion of the SICPA VINYLOFLEX ink is 1 after-treatment and remains at this value after aging for 100 h at 70° C.

Example 8R

A calendered film based on a PVC resin of the SOLVIC 264PC type, containing 14.4% by weight of dioctyl phthalate and 2.1% by weight of epoxidized soya oil underwent a corona treatment using the installation used in Example 2. The surface tension measured according to the ASTM D-2587-67 standard was 40 mN/m after treatment and 34 mN/m after 2 months of storage at ambient temperature.

Example 9R

A film identical to the one of Example 8R was treated under the conditions of Example 3R. The surface tension measured according to the ASTMD-2587-67 standard was 58 mN/m after treatment and 52 mNIm after 2 months of storage at ambient temperature.

Example 10

A film identical to the one of Example 8R was treated under the conditions of Example 4. The surface tension measured according to the ASTM D-2587-67 standard was 62 mN/m after treatment and 58 mN/m after 2 months of storage at ambient temperature.

What is claimed is:

1. A continuous process for surface treatment of at least one portion of a film comprising at least one plastic material, comprising:

oxidizing at least one portion of said film comprising at least one plastic material with an energetic surface oxidation step comprising a corona treatment, followed by fluorinating at least one portion of said oxidized portion by a gas phase fluorination step lasting at most 12 seconds.

2. The process according to claim 1, in which the film is a multilayer composite film of which at least the surface layer to be treated comprises at least one plastic material.

3. The process according to claim 1, in which the atleast one plastic material comprises at least one polyolefin.

4. The process according to claim 1, such that the at least one treated portion includes, at the surface, fluorine and oxygen concentrations such that the oxygen/carbon (O/C) atomic ratio, measured by Electron Spectroscopy for Chemical Analysis at a depth of 1.5 nm, is at least 0.08 and that the fluorine/carbon (F/C) atomic ratio, measured in the same way, has a value of at least 90% of that of the O/C ratio and of at most 290% of this ratio.

5. A process for manufacturing a printed article, comprising the steps of:

providing an article comprising at least one plastic material, surface treating at least a portion of said plastic material according to the process of claim 1 to produce at least one treated portion; and printing on at least one portion of said at least one treated portion.

6. In a process for manufacturing multilayer composite film including at least one layer comprising at least one plastic material, the improvement comprising surface treating at least a portion of said plastic material according to the process of claim 1.

* * * * *